(12) United States Patent
Yahata

(10) Patent No.: US 9,512,893 B2
(45) Date of Patent: Dec. 6, 2016

(54) TUBULAR VIBRATION-DAMPING DEVICE

(71) Applicant: SUMITOMO RIKO COMPANY LIMITED, Komaki-shi, Aichi (JP)

(72) Inventor: Yuki Yahata, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 0 days.

(21) Appl. No.: 14/805,755

(22) Filed: Jul. 22, 2015

(65) Prior Publication Data

US 2015/0323031 A1 Nov. 12, 2015

Related U.S. Application Data

(63) Continuation of application No. PCT/JP2014/072957, filed on Sep. 1, 2014.

(30) Foreign Application Priority Data

Sep. 24, 2013 (JP) .................................. 2013-196767

(51) Int. Cl.
F16F 1/38 (2006.01)

(52) U.S. Cl.
CPC ........... *F16F 1/3828* (2013.01); *F16F 1/3842* (2013.01); *F16F 1/3863* (2013.01); *F16F 2224/02* (2013.01); *F16F 2230/0005* (2013.01)

(58) Field of Classification Search
CPC ........... F16F 1/38; F16F 1/3842; F16F 1/387; F16F 1/3873; F16F 1/3828

(Continued)

(56) References Cited

U.S. PATENT DOCUMENTS 3,604,771 A * 9/1971 Luzsicza ................... F16F 1/38
384/125
5,103,529 A * 4/1992 Konig .................. B60G 99/004
16/2.1

(Continued)

FOREIGN PATENT DOCUMENTS

CN 1990287 A 7/2007
EP 1820993 A1 * 8/2007 ............ F16F 1/3814

(Continued)

OTHER PUBLICATIONS

Oct. 7, 2014 International Search Report issued in International Application No. PCT/JP2014/072957.

(Continued)

*Primary Examiner* — Thomas J Williams
(74) *Attorney, Agent, or Firm* — Oliff PLC

(57) ABSTRACT

A tubular vibration-damping device including an outer tube member made of synthetic resin, which includes a locking part having a locking projection. An abutting part is provided on an inner circumference side of the locking part across a recess. An axial tip end of the abutting part is aligned with or outward beyond an axial tip end of the locking part in an axial direction. A distance between facing surfaces of the locking part and the abutting part is set to not less than a projecting height of the locking projection. A restricting mechanism to prevent the locking projection from being displaced circumferentially inward beyond the outer tube member is provided by, through abutment of the locking part against the abutting part, restricting an amount of deformation of the locking part due to an external force exerted on the locking projection.

9 Claims, 7 Drawing Sheets

(58) Field of Classification Search
USPC .............. 267/141, 141.2, 141.3, 141.4, 141.6
See application file for complete search history.

(56) References Cited

U.S. PATENT DOCUMENTS

| | | | | |
|---|---|---|---|---|
| 5,127,698 A | * | 7/1992 | Konig | B60G 99/004 |
| | | | | 248/635 |
| 2004/0108639 A1 | * | 6/2004 | Kato | F16F 1/3842 |
| | | | | 267/141 |
| 2007/0145657 A1 | * | 6/2007 | Funano | B60G 21/052 |
| | | | | 267/293 |
| 2015/0323029 A1 | * | 11/2015 | Yahata | B60G 7/006 |
| | | | | 267/141.2 |

FOREIGN PATENT DOCUMENTS

| | | | | | |
|---|---|---|---|---|---|
| EP | 1820994 A1 | * | 8/2007 | ............ | F16F 1/3814 |
| GB | 1041820 A | * | 9/1966 | ............... | B60G 7/00 |
| GB | 2370338 A | * | 6/2002 | ............... | F16F 1/38 |
| JP | S62-40344 U | | 3/1987 | | |
| JP | H05-77637 U | | 10/1993 | | |
| JP | H06-129461 A | | 5/1994 | | |
| JP | H08-177917 A | | 7/1996 | | |

OTHER PUBLICATIONS

Jul. 20, 2016 Office Action issued in Chinese Patent Application No. 201480039865.7.

* cited by examiner

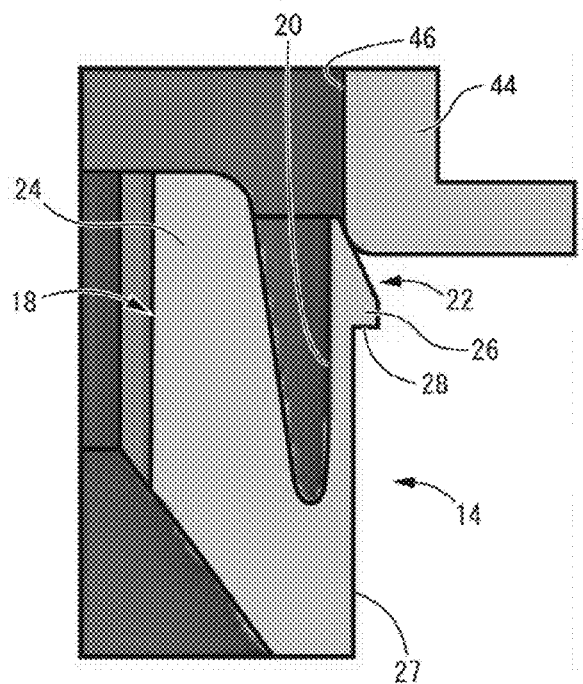
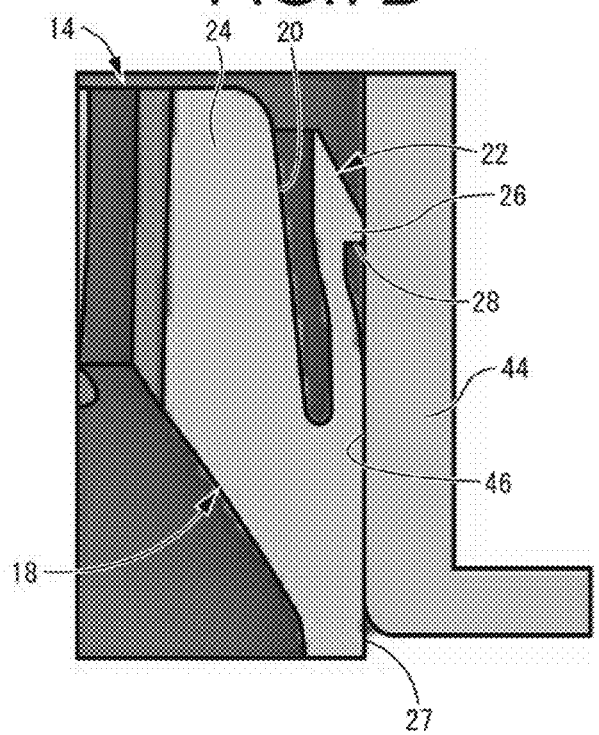

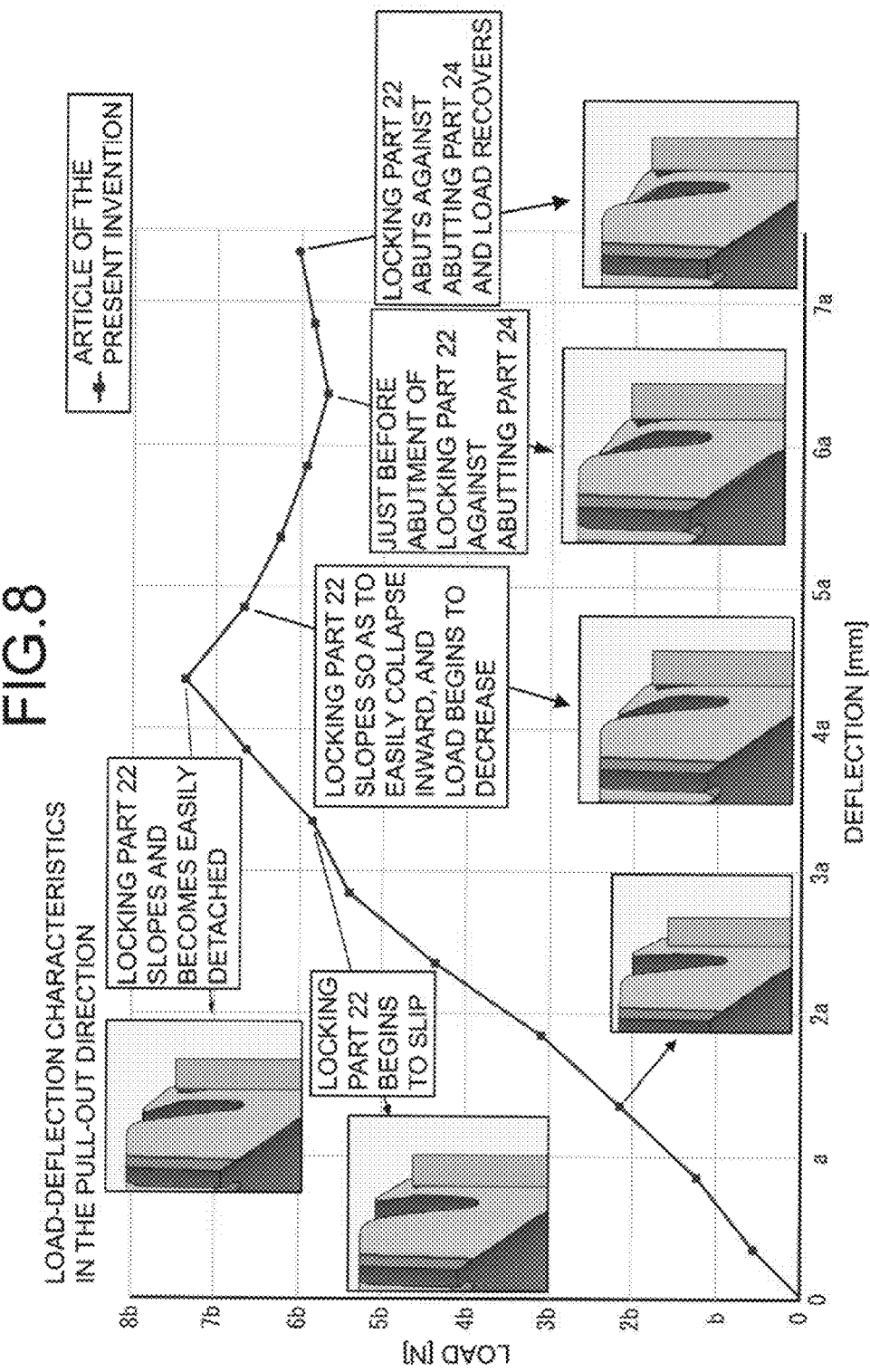

TUBULAR VIBRATION-DAMPING DEVICE

INCORPORATED BY REFERENCE

The disclosure of Japanese Patent Application No. 2013-196767 filed on Sep. 24, 2013, including the specification, drawings and abstract is incorporated herein by reference in its entirety. This is a Continuation of International Application No. PCT/JP2014/072957 filed on Sep. 1, 2014.

BACKGROUND OF THE INVENTION

1. Field of the Invention

The present invention relates to a tubular vibration-damping device that is suitably used as a member mount that is mounted on an attachment part or the like of a subframe or suspension member in relation to a main body of a vehicle, a vibration damping bush mounted to an attachment part or the like at a vehicle body side of a suspension member constituting a vehicle suspension mechanism, or the like.

2. Description of the Related Art

From the past, as one type of vibration-damping device, a tubular vibration-damping device for which an inner shaft member and an outer tube member are coupled by a main rubber elastic body has been known. In specific terms, a tubular vibration-damping device is shown in Japanese Unexamined Patent Publication No. JP-A-6-129461, Japanese Unexamined Utility Model Publication No. JP-U-5-077637 and the like. Also, with this kind of tubular vibration-damping device, for example, while an outer tube member is press-fitted and fixed to a mounting hole provided on an automobile suspension member, by fixing an inner shaft member to the main body, this is used to do vibration-damping support of the suspension member on the main body.

However, with the tubular vibration-damping device as described above, for reasons such as making it lighter, reducing manufacturing costs and the like, it has been attempted to use outer tube members made of synthetic resin rather than outer tube members made of metal.

However, with the outer tube member made of synthetic resin, because of permanent set-in fatigue due to heat or changes over time, it was difficult to obtain stable press fitting fixing force on the mounting hole over a long time, and it was difficult to ensure sufficient pull-out resistance force in the axial direction.

As shown in JP-A-6-129461 and JP-U-5-077637 noted above, to ensure pull-out resistance force in the axial direction with the outer tube member made of synthetic resin, a constitution has also been proposed for which a locking projection provided on an outer circumference surface of the outer tube member is locked on the end surface of the mounting hole. However, when an attempt is made to enlarge the projection height of the locking projection to increase the pull-out resistance force, there are cases where the locking projection becomes an obstacle when inserting the outer tube member in the mounting hole to mount it, and it was difficult to obtain sufficient pull-out resistance force with the locking projection.

SUMMARY OF THE INVENTION

The present invention has been developed in view of the above-described matters as the background, and it is an object of the present invention to provide a tubular vibration-damping device incorporating an outer tube member made of synthetic resin with a novel structure which is able to reliably meet both of two requirements which are mutually contradictory, namely, ease of operation when inserting and mounting the outer tube member to the mounting hole, as well as increase in the pull-out resistance force from the mounting hole after the mounting.

A first mode of the present invention provides a tubular vibration-damping device comprising: an inner shaft member; an outer tube member; and a main rubber elastic body coupling the inner shaft member and the outer tube member, wherein the outer tube member is made of synthetic resin, the outer tube member includes on its first axial end a locking part having a locking projection on its outer circumference surface, the outer tube member includes an abutting part on an inner circumference side of the locking part across a recess that opens axially outward, an axial tip end of the abutting part is positioned so as to be aligned with or outward beyond an axial tip end of the locking part in an axial direction of the outer tube member, a distance between facing surfaces of the locking part and the abutting part across the recess at a formation site of the locking projection is set to not less than a projecting height of the locking projection from an outer circumference surface of the outer tube member, and a restricting mechanism to prevent the projecting end of the locking projection from being displaced circumferentially inward beyond the outer circumference surface of outer tube member is provided by, through abutment of the locking part against the abutting part facing to the locking part across the recess, restricting an amount of deformation of a tip end part of the locking part due to an external force exerted outwardly in the axial direction on a projecting end of the locking projection.

At first, the inventor focused on the fact about the external force exerted on the locking projection which projects from the outer circumference of the locking part provided at the axial end of the outer tube member. Namely, the direction in which the external force is exerted as the insertion resistance during insertion operation into the mounting hole and the direction in which the external force is exerted as the pull-out resistance force under the mounted state in the mounting hole are mutually different. Specifically, the external force exerted as the insertion resistance during insertion operation into the mounting hole and the external force exerted as the pull-out resistance force under the mounted state in the mounting hole act on the locking projection in approximately opposite directions. Accordingly, by appropriately utilizing the fact that two modes of deformation of the locking part induced by these two external forces are significantly different from each other, the inventor was able to realize a novel locking part that does not become an obstacle during insertion operation into the mounting hole while exhibiting a large pull-out resistance force under the mounted state in the mounting hole.

That is, in comparison with deformation induced in the tip end part of the locking part during insertion operation into the mounting hole, the deformation due to pull-out resistance force exerted under the mounted state in the mounting hole causes the tip end part of the locking part to considerably collapse circumferentially inward of the outer tube member. Therefore, during insertion operation into the mounting hole, since the recess is formed with the diametrical widthwise dimension which is not less than the projecting height of the locking projection, deformation of the locking part circumferentially inward is permitted relatively easily. Thus, abutment frictional force of the locking projection against the inner surface of the mounting hole is reduced, making insertion into the mounting hole easy.

Meanwhile, under the mounted state in the mounting hole, when the tip end part of the locking part deforms so as to collapse circumferentially inward due to external force exerted in the pull-out direction, the tip end part of the locking part greatly projects circumferentially inward in a swinging manner. Therefore, the tip end part of the locking part efficiently abuts against the abutting part facing thereto across the recess, and the abutment action of the locking part against the abutting part restricts deformation of the locking part. As a result, the projecting end of the locking projection is effectively prevented from being detached from the end face of the mounting hole, thereby stably retaining the mounted state in the mounting hole.

A second mode of the present invention provides the tubular vibration-damping device according to the first mode, wherein the axial tip end of the abutting part is positioned so as to be axially outward beyond the axial tip end of the locking part.

With the tubular vibration-damping device according to the present mode, under the mounted state in the mounting hole, when the tip end part of the locking part deforms due to external force exerted in the pull-out direction, it is easy to obtain a sufficient abutting surface in the abutting part for abutment by the tip end part of the locking part. In particular, it is possible to easily provide the abutting surface in the abutting part for abutment by the locking part at a stage where the slope angle of the locking part is still relatively small.

A third mode of the present invention provides the tubular vibration-damping device according to the first or second mode, wherein an axial inward surface of the locking projection comprises a plane locking surface that extends in a substantially diametrical direction of the outer tube member, and in a state where the locking part abuts against the abutting part due to the external force exerted outwardly in the axial direction on the projecting end of the locking projection, a slope angle of the locking surface of the locking projection with respect to a surface orthogonal to a center axis of the outer tube member is not more than 45 degrees.

With the tubular vibration-damping device according to the present mode, by overlapping and mounting the plane locking surface of the locking projection that extends in the substantially diametrical direction onto the axial open end surface of the mounting hole, it is possible to obtain a large abutting area against the end face of the mounting hole from which the pull-out resistance force acts on the locking projection. As a result, under the mounted state in the mounting hole, the locking part is able to be stably locked to the mounting hole while obtaining an improved load-bearing strength in the pull-out force acting direction.

Moreover, with the tubular vibration-damping device according to the present mode, since the restricting mechanism restricts the deformation of the locking part, the slope angle of the locking surface is restricted to not more than 45 degrees so as to retain the locked state. Thus, even in the deformed state of the locking part, with respect to the external force exerted on its abutting site against the open end edge of the mounting hole, a component force in a direction in which the locking projection slides along the locking surface will be kept to a minimum, thereby more efficiently obtaining the pull-out resistance force.

A fourth mode of the present invention provides the tubular vibration-damping device according to any of the first to third modes, wherein the abutting part includes a stopper rubber projecting axially outward from the axial tip end of the abutting part.

With the tubular vibration-damping device according to the present mode, the pull-out force in the axial direction exerted under the mounted state in the mounting hole will be cushioned by elastic deformation of the stopper rubber. Thus, an impact load input to the retaining structure site by the locking part with respect to the mounting hole will be ameliorated, attaining the pull-out resistance force more efficiently.

A fifth mode of the present invention provides the tubular vibration-damping device according to any of the first to fourth modes, wherein the outer tube member is made thicker to the inner circumference side at its first axial end side so as to integrally form the abutting part.

With the tubular vibration-damping device according to the present mode, by making the first axial end side of the outer tube member thicker to the inner circumference side than the other parts, within a limited outer diameter dimension setting range, it is possible to provide the locking part and the abutting part while effectively ensuring the volume of the main rubber elastic body without making the thickness dimension of the outer tube member substantially larger.

Preferably, with the main rubber elastic body that couples the inner shaft member and the outer tube member, it is desirable to provide a lightening part that expands between the facing surfaces of the abutting part and the inner shaft member and opens at the first axial end surface. With this arrangement, at the first axial end side for which the distance between facing surfaces of the inner shaft member and the outer tube member in the radial direction becomes smaller due to the outer tube member being made thicker to the inner circumference side, having excessive concentration of stress and distortion on the main rubber elastic body is avoided, and it is possible to avoid markedly high spring increase and to improve the degree of freedom for tuning the spring characteristics.

A sixth mode of the present invention provides the tubular vibration-damping device according to any of the first to fifth modes, wherein the locking part has a thickness dimension made smaller at its tip end part than at its base end part.

With the tubular vibration-damping device according to the present mode, under the mounted state in the mounting hole, when the external force is exerted in the pull-out direction, it is possible to more stably exhibit the mode of deformation where the tip end part of the locking part deforms to curve circumferentially inward in a swinging manner owing to the elastic deformation of the locking part at the axially middle section (between its base end part and the locking projection).

It should be appreciated that the tubular vibration-damping device constructed according to the present invention appropriately utilizes the fact that the modes of deformation of the locking part are different between the case when the external force is exerted during insertion operation into the mounting hole and the case when the pull-out resistance force is exerted under the mounted state in the mounting hole. This allows the locking part not to become an obstacle during insertion operation into the mounting hole as well as to achieve a large pull-out resistance force under the mounted state in the mounting hole. Therefore, it is possible to realize a tubular vibration-damping device with a novel structure which is able to meet both of two requirements which are mutually contradictory, namely, ease of operation when inserting and mounting the outer tube member to the mounting hole, as well as increase in the pull-out resistance force from the mounting hole after the mounting.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein:

FIGS. 6A and 6B are views suitable for explaining modes of deformation of a locking part of the tubular vibration-damping device shown in FIG. 1, wherein FIG. 6A shows a case when the device is being press-fit into a mounting hole of a suspension member, and FIG. 6B shows a case when pull-out force is exerted under the mounted state;

FIGS. 7A and 7B are views suitable for explaining simulation results by a numerical model showing modes of deformation of the locking part during press-fitting operation of the tubular vibration-damping device shown in FIG. 1 into the mounting hole, wherein FIG. 7A shows an initial state of the press-fitting operation, and FIG. 7B shows an intermediate state of the press-fitting operation; and FIG. 8 is a view suitable for explaining simulation results by a numerical model showing a load-deflection diagram together with a mode of deformation of the locking part of the tubular vibration-damping device shown in FIG. 1 when pull-out force is exerted.

DETAILED DESCRIPTION OF PREFERRED EMBODIMENTS

Figure 1:
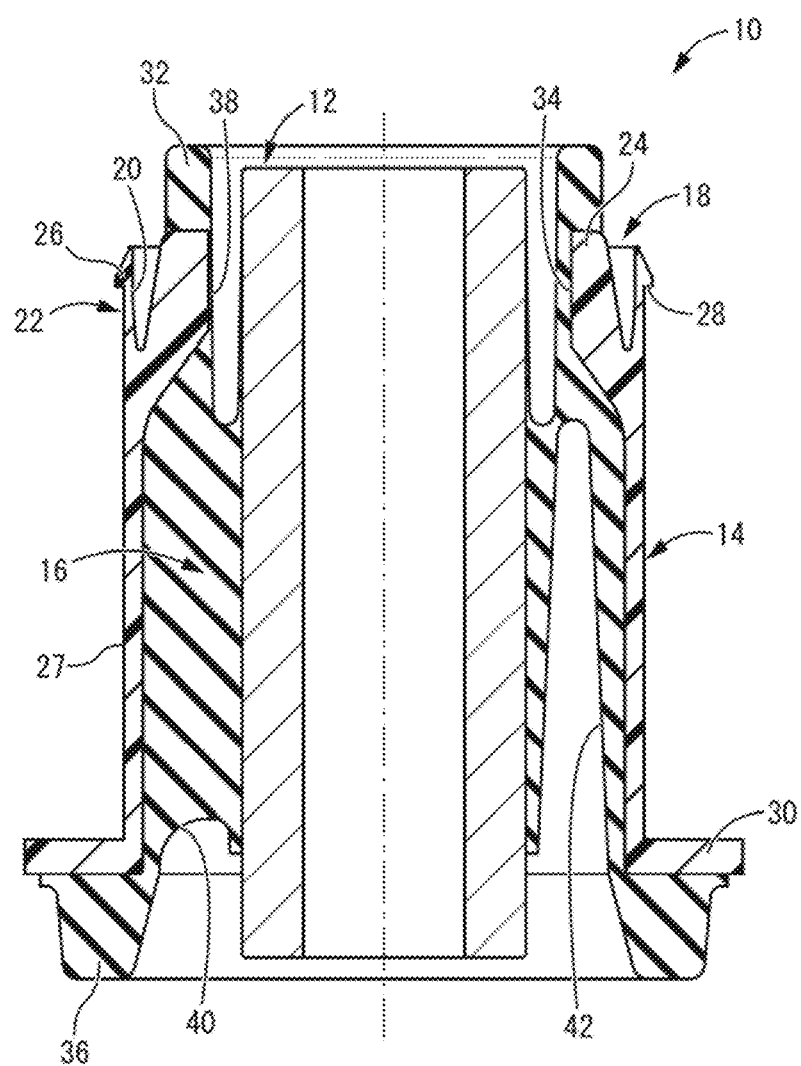
FIG. 1 is a vertical cross section view of a tubular vibration-damping device as a first embodiment of the present invention, taken along line 1-1 of FIG. 3.

Following, we will describe embodiments of the present invention while referring to the drawings.

Figure 2:
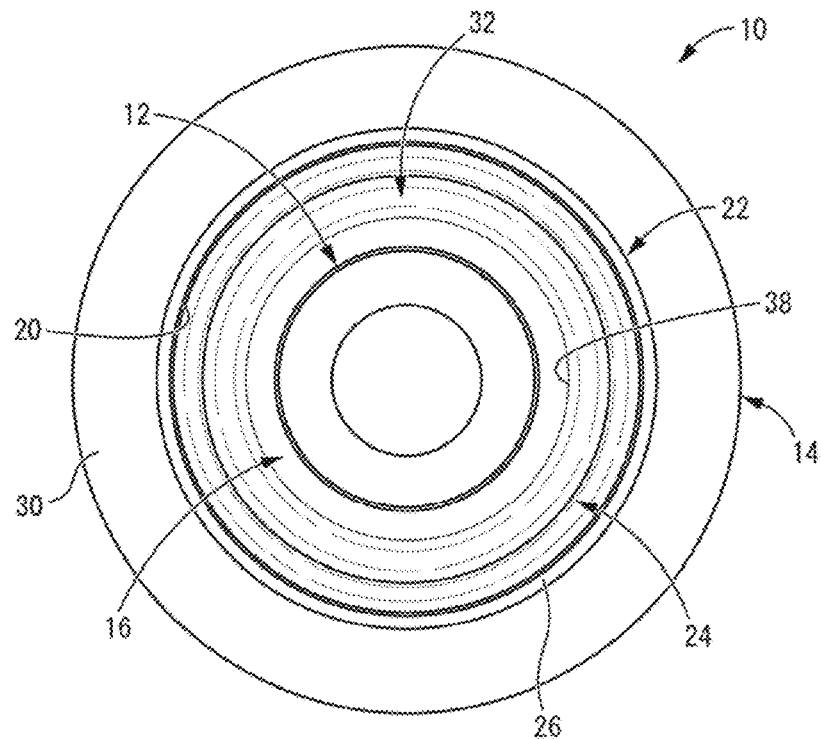
FIG. 2 is a plan view of the tubular vibration-damping device shown in FIG. 1.
Figure 3:
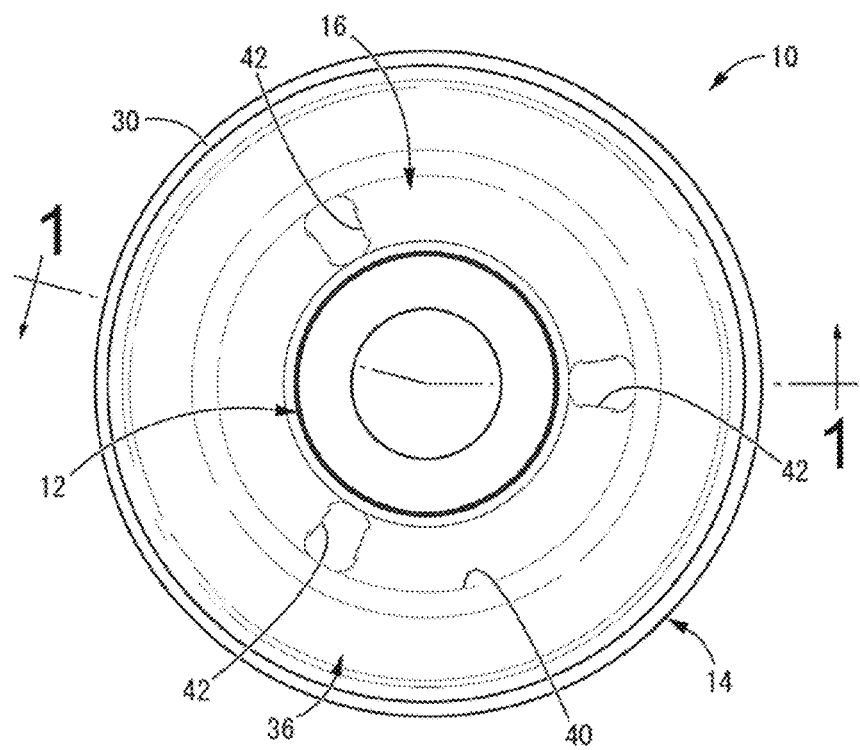
FIG. 3 is a bottom plane view of the tubular vibration-damping device shown in FIG. 1.

In FIGS. 1 to 3, as a first embodiment of the tubular vibration-damping device constituted according to the present invention, a suspension member mount 10 is shown. The suspension member mount 10 has a constitution for which an inner shaft member 12 is inserted into an outer tube member 14 while being separated by a designated distance, wherein the inner shaft member 12 and the outer tube member 14 are elastically coupled by a main rubber elastic body 16. With the description hereafter, as a rule, the vertical direction means the vertical direction in FIG. 1.

In more specific detail, the inner shaft member 12 is formed using a material such as metal, synthetic resin or the like, and exhibits a thick walled, small diameter roughly round cylinder shape.

Figure 4:
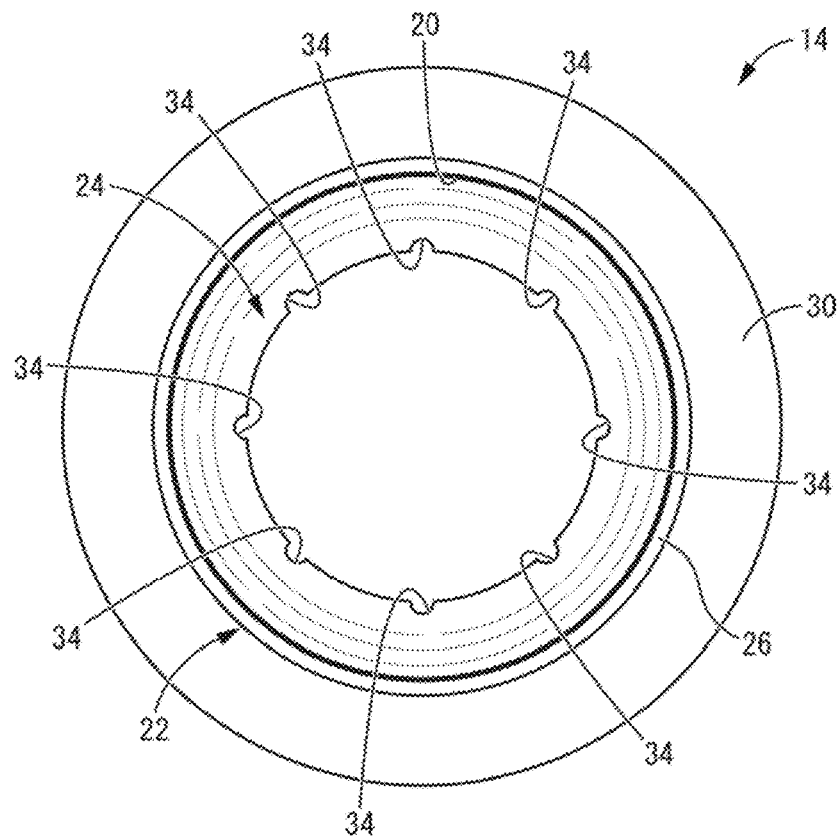
FIG. 4 is a plan view of an outer tube member of the tubular vibration-damping device shown in FIG. 1.

The outer tube member 14 is made of a synthetic resin material that is fiber reinforced as necessary, and as shown in FIG. 4, overall exhibits a thin walled, large diameter roughly round cylinder shape.

Also, the outer tube member 14 is fitted externally on the inner shaft member 12, the inner shaft member 12 and the outer tube member 14 are arranged separated by a designated distance in the axis perpendicular direction along the entire circumference, and the main rubber elastic body 16 is interposed between the inner shaft member 12 and the outer tube member 14. In particular, with this embodiment, the inner shaft member 12 and the outer tube member 14 are arranged coaxially on one mount center axis.

The main rubber elastic body 16 is a rubber elastic body having a thick walled roughly round cylinder shape, wherein the inner circumference surface is overlapped on and adhered to the outer circumference surface of the inner shaft member 12, and the outer circumference surface is overlapped on and adhered to the inner circumference surface of the outer tube member 14. By so doing, the inner shaft member 12 and the outer tube member 14 are elastically coupled in the axis perpendicular direction by the main rubber elastic body 16. The main rubber elastic body 16 can be formed as an integrally vulcanization molded component equipped with the inner shaft member 12 and the outer tube member 14.

Here, on the outer tube member 14 of the present embodiment, a thick walled part 18 for which the inner diameter dimension has been made small at the upper end part which is the first axial end, specifically, which has been made thicker to the inner circumference side, is integrally formed. At the inner circumference surface of the outer tube member 14, the connecting part of the middle part of the outer tube member 14 and the thick walled part 18 have a tapered shape, and the inner diameter dimension of that connecting part changes smoothly.

Also, on the thick walled part 18, a recess 20 that opens at the axial end surface and extends axially inward of the thick walled part 18 is formed. This recess 20 is a groove shaped recess extending in roughly a fixed cross section shape across the entire circumference in the circumference direction. With this recess 20, on the axial top end part of the thick walled part 18, constituted are a thin walled tubular locking part 22 in the outer circumference side, and a thick walled round ring block shaped abutting part 24 in the inner circumference side. Said another way, the abutting part 24 is formed at the inner circumference side of the locking part 22 across the recess 20 that opens axially outward of the outer tube member 14.

Also, the thickness dimension of this locking part 22 (the lateral direction dimension in FIG. 1) is slightly smaller than the thickness dimension of the middle part of the outer tube member 14, allowing for easy elastic deformation. A locking projection 26 is formed on the outer circumference surface of the top end part of the locking part 22. With this embodiment, this locking projection 26 is a hook shape projecting with a designated dimension from the outer circumference surface of an outer circumference surface 27 and the locking part 22 at the middle part of the outer tube member 14, and the top end surface of the locking projection 26 has an inclined surface that is gradually inclined to the inner circumference side going axially outward. With this arrangement, the width dimension of the locking projection 26 becomes gradually smaller going axially outward. Particularly in the present embodiment, the width dimension of the tip end of the locking projection 26 is made smaller than the width dimension of the part of the locking part 22 which is away from the locking projection 26 to the base end side. In other words, the thickness dimension of the locking part 22 is made smaller at the tip end part near the locking projection 26 than at the base end part, and as a result, the locking part 22 undergoes elastic deformation more easily at its tip end side than at its base end side. Besides, in the present embodiment, the lower end surface of the locking projection 26, namely, its axial inward surface, comprises a plane locking surface 28 that extends in the substantially diametrical direction of the outer tube member 14.

Also, while the abutting part 24 of this embodiment is a tubular shape which extends in the axial direction with roughly the same inner diameter dimension of the inner circumference surface across the entire circumference, the outer circumference surface is an inclined surface that gradually expands to the outer circumference side from the tip end side to the base end side. Also, in the outer tube member 14, the axial tip end of the abutting part 24 projects axially outward beyond the axial tip end of the locking part 22.

On the other hand, at the bottom end part which is the second axial end of the outer tube member 14, a flange part 30 that expands to the outer circumference side in the axis-perpendicular direction is formed. The distance in the axial direction between facing surfaces of the locking surface 28 of the locking projection 26 and the upper surface of the flange part 30 is equal to the axial dimension for the mounting hole of a suspension member 44 described later.

Furthermore, in the present embodiment, an upper stopper rubber 32 is provided to the top end surface of the abutting part 24 of the outer tube member 14, and is adhered thereto as needed. This upper stopper rubber 32 projects from the axial tip end surface of the abutting part 24 facing axially outward. In other words, the base end part of the upper stopper rubber 32 projecting axially outward is supported by the abutting part 24. Also, this upper stopper rubber 32 projects to a position further to the axially outside than the axial top end surface of the inner shaft member 12. Furthermore, the upper stopper rubber 32 of this embodiment has a thick walled round ring shape whose inner diameter dimension is roughly fixed while the outer diameter dimension of the base end part is made smaller than the outer diameter dimension of the top end surface of the abutting part 24. Note that as shown in FIG. 4 or the like, this upper stopper rubber 32 is connected to and integrally formed with the main rubber elastic body 16 through connecting slots 34 formed at equal intervals at eight locations on the circumference at the inner circumference surface of the abutting part 24.

Yet further, a lower stopper rubber 36 is formed as the other stopper rubber on the bottom surface of the flange part 30 of the outer tube member 14, while projecting facing axially outward from the flange part 30. This lower stopper rubber 36 projects further to the axially outside than the axial lower end surface of the inner shaft member 12, and is integrally formed with the main rubber elastic body 16. With this embodiment, this lower stopper rubber 36 has a thick walled, roughly round ring shape.

Furthermore, with this embodiment, an upper lightening part 38 extending axially inward from the axial top end surface of the main rubber elastic body 16 is formed around the periphery of the inner shaft member 12, and extends axially inward by a designated dimension. The outer circumference surface of this upper lightening part 38 is connected to the inner circumference surface of the upper stopper rubber 32 on the axial top part. Also, by the upper lightening part 38 being formed, higher spring in the axis-perpendicular direction that comes with formation of the abutting part 24 is avoided.

Also, a lower lightening part 40 that opens at the axial lower end surface is formed on the main rubber elastic body 16 of this embodiment. This lower lightening part 40 has a ring shaped recessed groove shape extending across the entire circumference in the circumference direction, and the outer circumference surface of the lower lightening part 40 is connected to the inner circumference surface of the lower stopper rubber 36 at the axial bottom part.

In particular, in the lower lightening part 40 of the present embodiment, three bore parts 42, 42, 42 for which the depth dimension is made larger are formed and arranged at equal intervals with the respective prescribed circumferential dimensions. Owing to these bore parts 42, 42, 42, with the suspension member mount 10 mounted on a vehicle described later, spring characteristics in the vehicle front-back direction and in the vehicle lateral direction are suitably adjustable.

Figure 5:
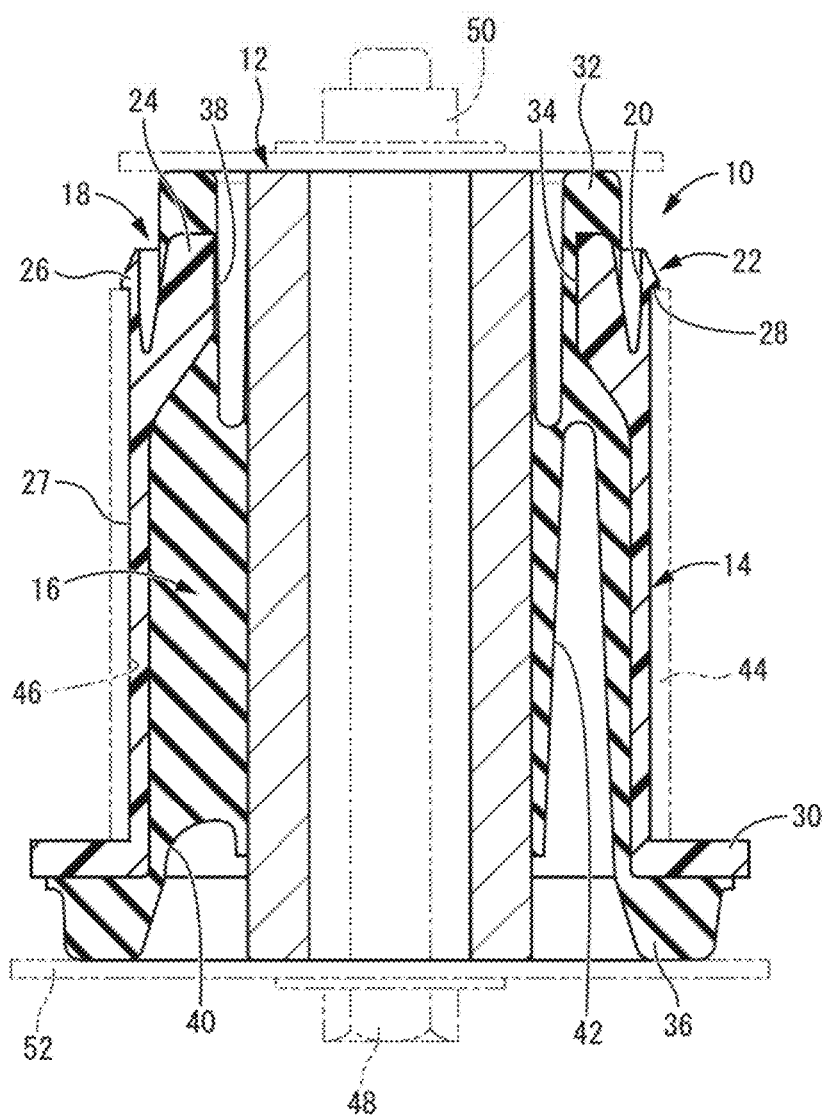
FIG. 5 is a vertical cross section view of the tubular vibration-damping device shown in FIG. 1 under the mounted state in a vehicle.

Furthermore, FIG. 5 shows the state of the suspension member mount 10 constituted as described above mounted on a vehicle. Specifically, the outer tube member 14 is inserted in the mounting hole of the suspension member 44, and by having a fixing bolt 48 inserted through the inner hole of the inner shaft member 12 and fastened by a fixing nut 50, a vehicle body 52 and the inner shaft member 12 are fixed by a bolt. By so doing, the vehicle body 52 and the suspension member 44 are coupled in a vibration damping manner by the suspension member mount 10. The suspension member mount 10 is mounted so as to have the vertical direction in FIG. 5 be the vehicle vertical direction, for example.

With the suspension member mount 10 constructed in the above manner, during press-fitting operation of into a mounting hole 46 of the suspension member 44, the locking part 22 undergoes elastic deformation circumferentially inward so as to withdraw projection of the locking projection 26 outward beyond the outer circumference surface 27 of the outer tube member 14. This allows press-fitting of the outer tube member 14 into the mounting hole 46 of the suspension member 44. Meanwhile, under the mounted state in the mounting hole 46 of the suspension member 44, even in the case where the force in the pull-out direction from the mounting hole 46 is exerted on the locking projection 26, an amount of elastic deformation of the locking part 22 circumferentially inward is restricted by abutment against the abutting part 24. Accordingly, the locked state of the locking projection 26 is maintained, thereby preventing slipping out of the outer tube member 14 from the mounting hole 46.

It should be appreciated that the external force Fa exerted on the locking projection 26 during press-fitting operation into the mounting hole 46 of the suspension member 44 and the external force Fb exerted on the locking projection 26 in the pull-out direction under the mounted state act in different directions from each other. Thus, modes of deformation of the locking part 22 in two cases are different.

Figure 6A:
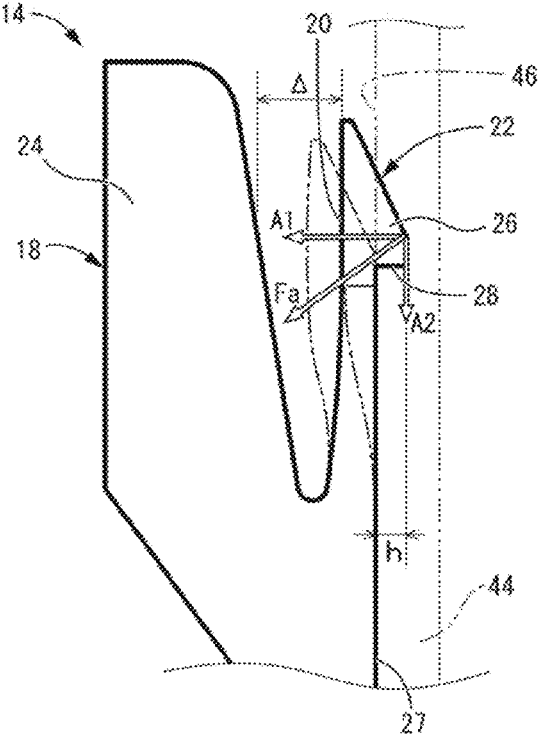

Specifically, in the former case, namely, during press-fitting operation into the mounting hole 46 of the suspension member 44, as shown in FIG. 6A, the projecting end of the locking projection 26 undergoes sliding-contact displacement in the axial direction while abutting against the inner circumference surface of the mounting hole 46. Therefore, on the projecting end of the locking projection 26, abutment reaction force A1 against the inner circumference surface of the mounting hole 46 and frictional force A2 against the inner circumference surface of the mounting hole 46 are exerted. Consequently, an external force Fa, which is the resultant force of these A1 and A2, is exerted on the projecting end of the locking projection 26 in the direction of sloping axially inward and diametrically inward.

As a result, as indicated by the imaginary lines in FIG. 6A, the locking part 22 displaces approximately parallel so that its tip end part provided with the locking projection 26 is pushed circumferentially inward generally as it is. Here, at the formation site of the locking projection 26 of the locking part 22, the width dimension of the recess 20, namely, the distance Δ between facing surfaces of the locking part 22 and the abutting part 24 across the recess 20, is set to not less than the projecting height h of the locking projection 26 from the outer circumference surface 27 of the outer tube member 14 in the diametrical direction (Δ≥h). Therefore, the tip end part of the locking part 22 undergoes deformation within the range where its elastic deformation circumferentially inward can be relatively easily permitted without abutting against the abutting part 24. Consequently, the projecting end of the locking projection 26 is positioned so as to be approximately aligned with the outer circumference surface 27 of the outer tube member 14 in the diametrical direction, permitting insertion of the locking projection 26 into the mounting hole 46. This enables press-fitting of the outer tube member 14 into the mounting hole 46 with good operation efficiency.

Figure 6B:
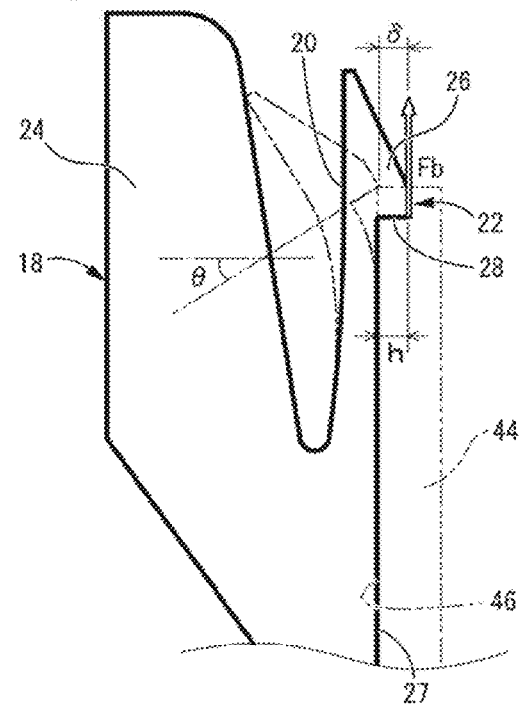

On the other hand, in the latter case, namely, when pull-out force is exerted under the mounted state, as shown in FIG. 6B, it can be thought that, on the projecting end of the locking projection 26, the abutment reaction force against the open end edge of the mounting hole 46 is exerted as an axial external force Fb, which is the pull-out resistance force. Therefore, as indicated by the imaginary lines in FIG. 6B, the locking part 22 undergoes sloping deformation so that its tip end part provided with the locking projection 26 collapses circumferentially inward with a bending point in the middle section in the height direction of the locking part 22 (at the approximately center portion in the item in the drawing).

Then, when the amount of deformation of the locking part 22 due to the external force Fb becomes larger, the tip end of the locking part 22 displaces circumferentially inward and abuts against the outer circumference surface of the abutting part 24 facing to the locking part 22 across the recess 20. As a result, further deformation of the locking part 22 is prevented, and the amount of deformation and displacement of the locking projection 26 circumferentially inward is restricted. Therefore, by setting the amount of displacement δ in the diametrical direction of the projecting end of the locking projection 26 for which the locking projection 26 deforms and displaces circumferentially inward from its original position and abuts against the abutting part 24 smaller than the projection height h of the locking projection 26 from the outer circumference surface 27 of the outer tube member 14 (δ<h), it is possible to prevent the projecting end of the locking projection 26 from being displaced beyond the outer circumference surface 27 of the outer tube member 14 so as to be detached circumferentially inward from the open end edge of the mounting hole 46. That is, the suspension member mount 10 includes a restricting mechanism to restrict displacement of the locking part 22 circumferentially inward through abutment of the locking part 22 against abutting part 24.

It is desirable that the slope angle θ for which the locking part 22 is allowed to deform until abutment against the abutting part 24 be set to not more than 45 degrees; With this arrangement, with respect to the axial external force Fb exerted on the locking surface 28, the component force exerted parallel to the locking surface 28 is limited to not more than Fb/2. Accordingly, the locking action by the locking surface 28 sticking to the open end edge of the mounting hole 46 as well as the sloping restricting action against the locking part 22 will be exhibited, whereby the pull-out resistance force from the mounting hole 46 is more efficiently exerted on the locking part 22. Note that the slope angle θ is obtained by the angle between the locking surface 28 and the surface orthogonal to the center axis of the outer tube member 14.

Incidentally, a numerical model was produced for the suspension member mount 10 constructed according to the preceding embodiment, and a numerical analysis was carried out using a finite element method (FEM) for each case when the suspension member mount 10 is press-fit into the mounting hole 46 and when the axial load is exerted in the pull-out direction of the suspension member mount 10 under the mounted state. Analysis results are demonstrated in FIGS. 7 and 8.

First, when the suspension member mount 10 is press-fit into the mounting hole 46, starting from the initial state shown in FIG. 7A, the outer tapered surface of the locking projection 26 of the locking part 22 abuts against the inner peripheral edge of the mounting hole 46. Then, by the outer tube member 14 being pushed axially inward of the mounting hole 46, the locking part 22 deforms and displaces so as to be pushed circumferentially inward, with the help of guiding action of the outer tapered surface of the locking projection 26 as well. As a result, as shown in FIG. 7B, the entire locking part 22 is inserted into the mounting hole 46, whereby insertion of the outer tube member 14 into the mounting hole 46 is enabled. Subsequently, when the locking part 22 projects from the opposite end of the mounting hole 46 and the projecting end of the locking projection 26 passes out of the mounting hole 46, the locking part 22 recovers due to its elasticity and expands in diameter, so that the locking surface 28 of the locking projection 26 is overlapped on the open end surface of the mounting hole 46 to get mounted (see FIG. 5).

On the other hand, under the mounted state of the suspension member mount 10, when the load is exerted on the outer tube member 14 in the axial direction, namely the pull-out direction from the mounting hole 46, the load-deflection characteristics are shown in FIG. 8. Specifically, under the state where the locking part 22 undergoes elastic deformation and the locking surface 28 of the locking projection 26 is about to be detached from the end face of the mounting hole 46, even if the deflection becomes still greater, the locking action of the locking projection 26 to the mounting hole 46 can be maintained. Thus, the outer tube member 14 is effectively prevented from slipping out of the mounting hole 46.

That is, if the pull-out load exerted on the outer tube member 14 in the axial direction increases, while maintaining the locked state where the locking surface 28 of the locking projection 26 is overlapped on the open end surface of the mounting hole 46, the amount of deflection as the amount of relative displacement in the pull-out direction of the outer tube member 14 progressively becomes larger, due to deformation of the locking part 22 in the axial direction or the like. Then, during the period wherein the amount of locking of the locking projection 26 to the open end of the mounting hole 46 is ensured, load-deflection characteristics as a generally linear function is obtained, although there are certain changes in association with the slight deviation of the locking projection 26 circumferentially inward or the like. Thereafter, when the sloping deformation of the locking part 22 circumferentially inward becomes greater and the amount of locking of the locking projection 26 to the open end of the mounting hole 46 decreases, the amount of deflection with respect to the load increases through the load peak. However, when the tip end of the locking part 22 abuts against the abutting part 24 and the sloping deformation of the locking part 22 is restricted, the amount of locking of the locking projection 26 to the open end of the mounting hole 46 can be maintained, thereby improving load-bearing characteristics.

As will be understood from the above description, due to restriction of the amount of deformation of the tip end part of the locking part 22 by abutment against the abutting part 24, pull-out bearing strength with respect to the external force exerted in the axial direction is improved, so that the mounted state in the mounting hole 46 will be stably maintained.

Therefore, the suspension member mount 10 according to the present embodiment as described above is able to realize easy insertion of the mount 10 into the mounting hole 46 of the suspension member 44, as well as to reliably prevent slipping out of the suspension member mount 10 from the mounting hole 46 after mounting owing to increase of the pull-out resistance force.

In particular, since the outer tube member 14 of the suspension member mount 10 is made of synthetic resin, the locking part 22 is able to undergo elastic deformation more easily in comparison with the outer tube member 14 made of metal, for example. This ease of elastic deformation of the locking part 22 contributes to meet two requirements which are mutually contradictory, namely, ease of insertion and increase in the pull-out resistance for the suspension member mount 10.

Above, we gave a detailed description of an embodiment of the present invention, but the invention shall not be construed as limited in any way to the specific disclosures in the embodiment. For example, the abutting part, other than being integrally formed with the outer tube member, can also be prepared as a separate component and be attached to the outer tube member later by bonding, press-fitting, welding, or the like.

Besides, the amount of deformation until the locking part abuts against the abutting part can desirably be set in consideration of required characteristics or the like. For example, in the aforementioned simulation, the locking projection 26 deforms in the direction of being detached from the open end of the mounting hole 46 and the locking part 22 abuts against abutting part 24 after the load-deflection diagram exhibits its peak. However, it would also be acceptable to set such that the locking part abuts against the abutting part before the stage where the load-deflection diagram reaches its peak. Specifically, the locking part may abut against the abutting part at the point before the locking part slopes and becomes easily detached from the mounting hole so that the deformation of the locking part is restricted. With this arrangement, it is also possible to establish an even larger pull-out load bearing value which exhibits the peak in the load-deflection diagram.

Moreover, whereas in the preceding embodiment, the axial tip end of the abutting part 24 projects axially outward beyond the axial tip end of the locking part 22, the axial tip end of the locking part and the axial tip end of the abutting part may be aligned with each other in the axial direction.

Also, the size of the upper stopper rubber 30, the lower stopper rubber 36, the upper lightening part 38, the lower lightening part 40, and the bore part 42 is not limited to the shape of the aforementioned embodiment. For the sizes, it is possible to change the design as appropriate according to the required vibration-damping characteristics, and adjusting these sizes enables tuning for the required vibration-damping characteristics. Naturally, these are not absolutely essential for the present invention.

Furthermore, with the embodiment noted above, the locking part 22 and the abutting part 24 are formed across the entire circumference in the circumference direction, but the invention is not limited to this mode. Specifically, the locking part and the abutting part can also be formed in plurality at the corresponding locations on the circumference. Alternatively, one can be formed across the entire circumference on the circumference, while the other can be formed at a plurality of locations on the circumference or the like. Also, when the locking parts are formed at a plurality of locations on the circumference, it is possible to form them by providing slits extending axially inward from the axial end surface of the outer tube member on both end parts in the circumference direction of the locking part, and it is possible to adjust the size of this slit to adjust the deformation characteristics of the locking part.

Yet further, with preceding embodiment, at the axial bottom end part of the outer tube member 14, the flange part 30 is formed across the entire circumference of the circumference direction, but for example it can be formed partially at a plurality of locations on the circumference. Naturally, the flange part at the axial bottom end part is not absolutely necessary for the present invention. Therefore, for example, even in a case when it is necessary to stipulate the position in the axial direction of the outer tube member in relation to the mounting hole of the suspension member, it is also possible to use the same locking structure as the axial top end part for the axial bottom end part of the outer tube member.

Also, with the embodiments noted above, a hook shaped locking projection 26 was used, but as noted in JP-U-5-077637 described above, it is also possible to use a locking projection having a mountain shaped cross section or the like, and the shape of the locking projection can be changed as appropriate according to the shape of the suspension member which is fitted externally on the outer tube member.

Moreover, in the preceding embodiment, the outer tube member 14 is made of synthetic resin in its entirety, but it is not necessary. Specifically, it is acceptable as long as only the locking part of the outer tube member is made of synthetic resin which has both strength and ease of elastic deformation. For example, the tubular main body part and the axial end locking part of the outer tube member may be formed of different resin materials by two-color molding process or the like. It would also be acceptable that a reinforcing member made of metal or the like is fixed to an appropriate site of the outer tube member by fixing mechanism such as bonding or the like.

Furthermore, the present invention can be used not only for various types of tubular vibration-damping devices for which the mount center axis is arranged along roughly the vertical direction as described by example, but can also be used for a bush or the like for which the mount center axis is arranged along roughly the horizontal direction or the like. Particularly, it is suitable for a vibration-damping device wherein an input load in the axial direction is applied in the direction for which the outer tube member falls out from the mounting hole.

What is claimed is:

1. A tubular vibration-damping device comprising:
   an inner shaft member;
   an outer tube member; and
   a main rubber elastic body coupling the inner shaft member and the outer tube member, wherein
   the outer tube member is made of synthetic resin,
   the outer tube member includes on its first axial end a locking part having a locking projection on its outer circumference surface, the outer tube member includes an abutting part on an inner circumference side of the locking part across a recess that opens axially outward, an axial tip end of the abutting part is positioned so as to be aligned with or outward beyond an axial tip end of the locking part in an axial direction of the outer tube member, a distance between facing surfaces of the locking part and the abutting part across the recess at a formation site of the locking projection is set to not less than a projecting height of the locking projection from an outer circumference surface of the outer tube member, and a restricting mechanism to prevent the projecting end of the locking projection from being displaced circumferentially inward beyond the outer circumference surface of outer tube member is provided by, through abutment of the locking part against the abutting part facing to the locking part across the recess, restricting an amount of deformation of a tip end part of the locking part due to an external force exerted outwardly in the axial direction on a projecting end of the locking projection, an axial inward surface of the locking projection comprises a plane locking surface that extends in a substantially diametrical direction of the outer tube member, and in a state where the locking part abuts against the abutting part due to the external force exerted outwardly in the axial direction on the projecting end of the locking projection, a slope angle of the locking surface of the locking projection with respect to a surface orthogonal to a center axis of the outer tube member is not more than 45 degrees.

2. The tubular vibration-damping device according to claim 1, wherein the axial tip end of the abutting part is positioned so as to be axially outward beyond the axial tip end of the locking part.

3. The tubular vibration-damping device according to claim 1, wherein the abutting part includes a stopper rubber projecting axially outward from the axial tip end of the abutting part.

4. The tubular vibration-damping device according to claim 1, wherein the outer tube member is made thicker to the inner circumference side at its first axial end side so as to integrally form the abutting part.

5. The tubular vibration-damping device according to claim 1, wherein the locking part has a thickness dimension made smaller at its tip end part than at its base end part.

6. A tubular vibration-damping device comprising:
an inner shaft member;
an outer tube member; and
a main rubber elastic body coupling the inner shaft member and the outer tube member, wherein
the outer tube member is made of synthetic resin,
the outer tube member includes on its first axial end a locking part having a locking projection on its outer circumference surface,
the outer tube member includes an abutting part on an inner circumference side of the locking part across a recess that opens axially outward,
an axial tip end of the abutting part is positioned so as to be aligned with or outward beyond an axial tip end of the locking part in an axial direction of the outer tube member,
a distance between facing surfaces of the locking part and the abutting part across the recess at a formation site of the locking projection is set to not less than a projecting height of the locking projection from an outer circumference surface of the outer tube member,
a restricting mechanism to prevent the projecting end of the locking projection from being displaced circumferentially inward beyond the outer circumference surface of outer tube member is provided by, through abutment of the locking part against the abutting part facing to the locking part across the recess, restricting an amount of deformation of a tip end part of the locking part due to an external force exerted outwardly in the axial direction on a projecting end of the locking projection, and
the abutting part includes a stopper rubber projecting axially outward from the axial tip end of the abutting part.

7. The tubular vibration-damping device according to claim 6, wherein the axial tip end of the abutting part is positioned so as to be axially outward beyond the axial tip end of the locking part.

8. The tubular vibration-damping device according to claim 6, wherein the outer tube member is made thicker to the inner circumference side at its first axial end side so as to integrally form the abutting part.

9. The tubular vibration-damping device according to claim 6, wherein the locking part has a thickness dimension made smaller at its tip end part than at its base end part.

* * * * *